United States Patent
Baghestani et al.

(10) Patent No.: US 12,141,748 B2
(45) Date of Patent: *Nov. 12, 2024

(54) MATCHING INVENTORY CHARACTERISTICS AND STRUCTURE

(71) Applicant: Capital One Services, LLC, McLean, VA (US)

(72) Inventors: Saman Baghestani, Plano, TX (US); Brandon Drumheller, Plano, TX (US); Walker Ramirez, Frisco, TX (US); Veerendra Jote, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 140 days.

This patent is subject to a terminal disclaimer.

(21) Appl. No.: 17/901,976

(22) Filed: Sep. 2, 2022

(65) Prior Publication Data

US 2023/0108984 A1 Apr. 6, 2023

Related U.S. Application Data

(63) Continuation of application No. 17/104,684, filed on Nov. 25, 2020, now Pat. No. 11,436,561.

(51) Int. Cl.
*G06Q 10/08* (2024.01)
*G06Q 10/087* (2023.01)
*G06Q 40/03* (2023.01)

(52) U.S. Cl.
CPC .......... *G06Q 10/087* (2013.01); *G06Q 40/03* (2023.01)

(58) Field of Classification Search
CPC ............................ G06Q 10/087; G06Q 40/03
See application file for complete search history.

(56) References Cited

U.S. PATENT DOCUMENTS 10,223,722 B2  3/2019  Seergy et al.
10,438,256 B2  10/2019 Wollmer et al.
(Continued)

OTHER PUBLICATIONS

International Search Report and Written Opinion of the International Searching Authority directed to related International Patent Application No. PCT/US21/60798, mailed Feb. 4, 2022; 18 pages.

*Primary Examiner* — Fahd A Obeid
*Assistant Examiner* — Reva R Moore
(74) *Attorney, Agent, or Firm* — Sterne, Kessler, Goldstein & Fox P.L.L.C.

(57) ABSTRACT

Disclosed herein are system, method, and computer program product embodiments for providing an overall assessment of a combined inventory item and structure similarity to an initial inventory item and structure. A plurality of inventory items, stored in a database, maybe retrieved to generate a score value corresponding to each of the plurality of inventory items based on a plurality of facets describing the inventory item. Based on the generated score value, a subset of the plurality of inventory items may be determined based on data points representing the subset of the plurality of inventory items that are within a preconfigured Euclidean distance from a centroid representing a data point corresponding to the initial inventory item. One or more structures corresponding to the subset of the plurality of inventory items may be dynamically generated, and their combinations are scored for finding an alternate inventory item and structure.

20 Claims, 5 Drawing Sheets

(56) References Cited

U.S. PATENT DOCUMENTS

| | | |
|---|---|---|
| 10,445,804 B2 | 10/2019 | Gormley |
| 2005/0086187 A1 | 4/2005 | Grosser et al. |
| 2008/0046383 A1 | 2/2008 | Hirtenstein et al. |
| 2008/0103946 A1 | 5/2008 | Johnson et al. |
| 2009/0177689 A1* | 7/2009 | Song ................ G06Q 30/02 707/E17.046 |
| 2010/0023357 A1 | 1/2010 | Walker et al. |
| 2010/0153198 A1 | 6/2010 | Murphy et al. |
| 2015/0120489 A1 | 4/2015 | Edelman |
| 2016/0364783 A1* | 12/2016 | Ramanuja .......... G06Q 30/0625 |
| 2021/0233164 A1* | 7/2021 | Gaur ................. G06Q 30/0641 |
| 2022/0164764 A1 | 5/2022 | Baghestani et al. |

\* cited by examiner

MATCHING INVENTORY CHARACTERISTICS AND STRUCTURE

This application is a continuation of U.S. application Ser. No. 17/104,684, filed Nov. 25, 2020.

BACKGROUND

When a buyer visits a dealer to buy an item such as a vehicle, the buyer may already have thought about the vehicle and terms such as a monthly installment, an interest rate, or a loan period at which the buyer may consider the purchase of the vehicle as a better offer. However, a vehicle that is exactly similar to the vehicle of the buyer's choice may not be available. Further, the vehicle of the buyer's choice may not be available at the buyer's terms. In this case, the buyer is presented with alternative vehicles that may or may not be similar to the vehicle the buyer is looking to purchase. The buyer may select one vehicle from the alternative vehicles, but the selected alternative vehicle may not be available at the buyer's terms. Accordingly, the entire purchase process may become a time-consuming process leaving both the buyer and the dealer unsatisfied.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

In order to retain and close a sale with a prospective buyer, it is beneficial to provide additional options to select products that match the prospective buyer's initial choice. In the case of a vehicle purchase, it is desirable to provide the prospective buyers with other vehicles that match their initial choice, and that are available at the terms that are comparable to the terms the buyer would likely proceed to complete the purchase process.

For example, the buyer may visit the dealership to purchase a vehicle of a particular make and model, and/or having specific features. The buyer may be interested in purchasing the vehicle, if the vehicle of the particular make, model, and/or the specific features is available at certain purchase terms. For example, the buyer may have decided not to purchase the vehicle if the monthly installment of the vehicle loan is above US$500 for a loan term of 5 years with a down-payment of US$2000. However, based on the buyer's credit history and other factors, the buyer may need to provide a higher down-payment. It is known that the purchase or financing terms for each vehicle may vary based on various factors related to the buyer's credit report etc. and other factors, such as time of the year, available inventory, time for which the vehicle is on the floor, weather forecast, etc. Accordingly, presenting to the buyer vehicles similar to the vehicle of the buyer's choice, and then approaching the lender(s) would be a time consuming process. Various embodiments in this disclosure describe dynamically generating a structure of terms for each of the alternative vehicles and calculate a combined score based on the similarity of the generated structure and the alternative vehicle to the vehicle and terms of the buyer's choice. Accordingly, when the buyer is presented the vehicle and the structure based on the combined score, the buyer is more likely to proceed with the purchase of the alternative vehicle and leave as a satisfied customer. And, the dealer would be able to complete the transaction faster.

In one embodiment, a method is disclosed that selects the combination of the alternative inventory item and the associated structure.

Various embodiments of this disclosure will be discussed with respect to the corresponding figures.

Figure 1:
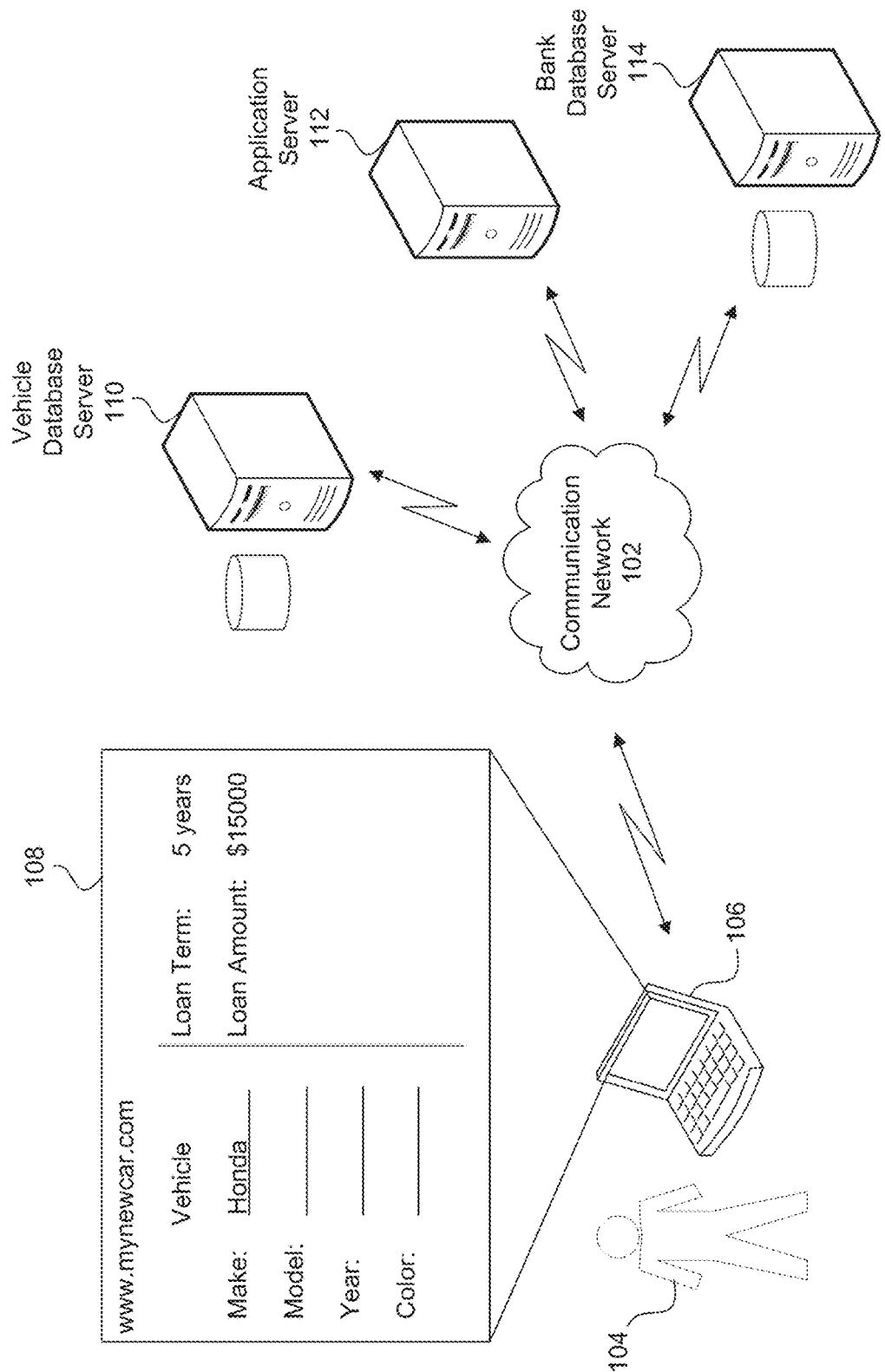
FIG. 1 illustrates an example environment, according to some embodiments.

FIG. 1 illustrates an example network environment, in accordance with some embodiments, in which various embodiments described in this disclosure may be practiced. In FIG. 1, a vehicle database server 110, an application server 112, and a bank database server 114 are shown communicatively coupled with each other via a communication network 102. Even though only one instance of the application server 112, the vehicle database server 110, and the bank database server 114 are shown in FIG. 1, there may be more than one instance of the application server 112, the vehicle database server 110, and/or the bank database server 114 communicatively coupled with each other via the communication network 102. Further, the application server 112 may also include a database, and the bank database server 114 and the vehicle database server 110 may be an application server. A user 104 may communicate via a client device 106 with the application server 112 over the communication network.

In some embodiments, as shown in FIG. 1, the user 104 accesses a website at an address, which is hosted by the application server 112. By way of non-limiting example, the user 104 may have installed a mobile application on the client device 106, and the user may perform the functions available via a web interface using the mobile application.

In some embodiments, by way of a non-limiting example, the user 104 may be a salesperson at a dealer, a bank employee, or a customer, etc., that may require to be authenticated when the user 104 accesses the website or launches the mobile application. The user 104 may be authenticated using a user ID and password and/or biometric information. The biometric information may include fingerprint, the shape of the hand and/or the finger, the shape of the face, iris or retina of the eye, etc. The user 104 may be authenticated using 2-factor authentication for additional security.

In some embodiments, the user 104 may be presented a form 108 in which the user 104 may provide values for configuration parameters that describe an inventory item the user 104 would like to purchase. For example, the user 104 is looking for a vehicle to purchase. Accordingly, the user 104 may provide values for the configuration parameters that describe a type of vehicle the user 104 would like to purchase.

While the configuration parameters are shown in FIG. 1 correspond to make, model, year, and color of the vehicle, the configuration parameters may include other features of the vehicle, such as body style, engine, mileage, trim, vehicle condition, interior color, price, etc. While a vehicle is used as an example of an inventory item in this disclosure, various embodiments described herein may be applied to other types of inventory items as well, for example, an appliance such as a television, a refrigerator, etc., or furniture such as a sofa, an office desk, etc.

As shown in FIG. 1, the user 104 may also provide a value for a term that describes a structure, e.g., a financial loan structure. The financial loan structure may include aspects, such as a value for a loan term, e.g., 5 years, a value for a loan amount, e.g., USD fifteen thousand, and/or a monthly installment of a vehicle loan, e.g., USD 200 per month, etc. The user may also specify a monthly installment. In other words, the user 104 may provide information regarding what type of vehicle the user 104 is looking for and what type of financial structure the user would like to consider for the purchase of the vehicle. Accordingly, a sales person at the vehicle dealership may suggest one or more matching vehicles available according to aspects of the financial loan structure.

In some embodiments, by way of a non-limiting example, the user 104 may be a customer, a salesperson at a dealer, a bank employee, etc. The user 104 as the customer may provide details of the vehicle and the loan structure via the form 108 to the application server 112. The user 104 as the salesperson may receive details of the vehicle and the loan structure from a to-be buyer of the vehicle to fill in the form 108 to send to the application server 112. In some embodiments, the user 104 as the salesperson may receive details of the vehicle from a to-be-buyer of the vehicle and provide loan structure information based on the received vehicle details and the received vehicle details in the form 108 to send to the application server 112. The user 104 as the bank employee may be assisting the to-be buyer in finding a vehicle at one or more vehicle dealerships with a financial loan structure based on the information received from the to-be buyer to fill in the form 108 to send to the application server 112.

In some embodiments, a prospective buyer may select a vehicle online on a website, and obtain an initial prequalification information for the selected vehicle. The prequalification information may specify loan structure details based on the buyer details, such as income, full name, address, and/or information to receive a credit score or other similar information, provided for obtaining the initial prequalification information. Based on the initial prequailification information, the user may adjust the financial loan structure to preferred loan terms, for example, increase or decrease a loan amount, a term of the loan, and/or a monthly installment, etc. By way of a non-limiting example, the buyer details may also include trade-in value of another vehicle.

In some embodiments, upon receiving information identifying the vehicle and the financial loan structure, the application server 112 may access the vehicle database server 110 to retrieve the plurality of inventory items based on a plurality of records stored in a database at the vehicle database server 110. The vehicle database server 110 may be a single database server or a plurality of database servers together, storing the plurality of records in the database. By way of non-limiting example, one or more servers of the plurality of database servers may be located at different physical locations. The one or more servers of the plurality of database servers may be owned and operated by different institutes. The application server 112 may send a database query to the vehicle database server 110 or may communicate to the vehicle database server 110 using any of the mechanisms, e.g., a secure hypertext transfer protocol (HTTPS) message, a hypertext transfer protocol (HTTP) message, a web service message based on a simple object access protocol (SOAP) and/or a representational state transfer (REST) architecture. By way of non-limiting example, the application server 112 may communicate with the vehicle database server using a proprietary messaging protocol to retrieve the plurality of inventory items based on the plurality of records stored in the database at the vehicle database server 110.

In some embodiments, the application server 112 may send a query message that includes information identifying the vehicle based on the information received from the user 104 in the form 108 to the vehicle database server 110. The application server may query the vehicle database server 110 based on the exact information received in the form 108 or may use expanded values for the search terms based on the information received in the form 108. For example, if the year of the vehicle in the form 108 is specified as 2010, the application server may query the vehicle database server 110 for the vehicles that were built in years 2008, 2009, 2010, 2011, and 2012. If the color of the vehicle in the form 108 is specified as red, the application server may query the vehicle database server 110 for the vehicle having color either red or maroon. If the price of the vehicle is indicated to be USD 20,000, then the application server 112 may query the vehicle database server 110 with the price of the vehicle as any value between USD 18,000 and USD 22,000. The application server may have preconfigured values or thresholds for each search term to be used for querying the vehicle database server. The preconfigured values for each search term may be enabled or disabled on a search term basis. The preconfigured values for each search term may be updated periodically and/or per query, either based on input from the user 104 or based on market research.

In some embodiments, the application server 112 may then generate a score value for each vehicle of the plurality of vehicles based on the plurality of records received by the application server from the vehicle database server. The application server 112 may generate the score value for each vehicle based on a different weight assigned to each facet of the vehicle. The different weights assigned to each facet of the vehicle helps to identify which facet is more important than other facets. Various facets of the vehicle may include body style, drive type, transmission type, engine, exterior color, interior color, make, model, mileage, trim, price, year, book value, etc. Accordingly, the application server may generate the score value based on the weights assigned to each facet, and a value of each facet compared to the value of the facet received from the user 104.

In some embodiments, the application server 112 may determine a subset of the plurality of vehicles based on the generated score value. The application server may use artificial intelligence, including neural network and/or machine learning algorithms, to determine the subset of the plurality of vehicles. Each vehicle of the plurality of vehicles is associated with a score value. Each vehicle may be represented by a data point corresponding to the score value.

In some embodiments, the plurality of data points that represent the plurality of vehicles may be distributed in a plurality of clusters. Accordingly, the cluster size reduces if the total number of clusters increases. Each cluster has a centroid point that is arbitrarily selected. However, one of the clusters may have as its centroid a data point that corresponds to a vehicle based on the values provided in the form 108 by the user 104. A vehicle corresponding to each data point may be assigned to a centroid that minimized the Euclidean distance. A cluster is formed from all data points where a given centroid minimized the Euclidean distance. Next, within each cluster a new centroid may be chosen and the K-means clustering algorithm may be repeated until the cluster becomes stable. For the vehicle based on the values provided in the form 108 by the user 104 and its corresponding data point, the similar vehicles are the ones where their data points lie in the same cluster. By way of a non-limiting example, the distance between centroid and data points may be a weighted distance.

Based on Euclidean distance between the centroid and each data point, a vehicle corresponding to a data point is selected for the subset of the plurality of vehicles, if the Euclidean distance is within a preconfigured threshold distance. The data points within the preconfigured threshold Euclidean distance correspond to the vehicles that match (e.g., have sufficient and relevant similarity to) the user 104 provided values for the vehicle. Accordingly, the user 104 may consider the vehicle whose data point is within the preconfigured threshold Euclidean distance from the centroid of the cluster.

Since the user is looking for not just a vehicle or a similar vehicle, but also a financial loan structure that is within a credit policy of a lender, in some embodiments, the application server 112 may query the bank database server 114. The bank database server 114 may be similar to the vehicle database server 110 and may communicate with the application server 112, similar to the vehicle database server 110. The bank database server may store information regarding a to-be buyer's financial information, including but not limited to monthly income, debt-to-income ratio, etc. The application server 112 then generates one or more structures based on a pricing algorithm and/or underwriting policies of the lender for the vehicle that corresponds with the values provided in the form 108 and for each vehicle in the subset of the plurality of vehicles. The application server 112 may take into account price of the vehicle, the duration for which the vehicle remains unsold, the total inventory, time of the year, etc., in addition to the to-be buyer's financial capabilities, to generate the one or more structures according to the underwriting policies of the lender for the vehicle that corresponds with the values provided in the form 108 and for each vehicle in the subset of the plurality of vehicles. Accordingly, the application server 112 may generate the one or more structures, each having a different value for one or more aspects of the structure. The aspects of the structure may be, for example, a down payment amount, a term of the loan, a monthly installment amount, warranty, etc. In some embodiments, the one or more structures according to the underwriting policies of the lender may be generated by a policy engine server. The one or more structures generated by the application server 112 or a policy engine server may also specify whether the one or more structures are within an underwriting policy (e.g. would be approved by the lender) or out of policy.

In some embodiments, the application server 112 may then score the combination of the vehicle based on the inputs in the form 108 and the one or more corresponding structures based on a weight assigned to each aspect of the structure and the vehicle. By way of a non-limiting example, the weight assigned to each aspect of the structure and the vehicle may be statically and/or dynamically configurable in real-time. The weight assigned to each aspect of the structure and the vehicle may have the same or different value. Thus, a score having a value between 0 and 1.0, both inclusive, may be generated based on the combination of the structure and vehicle similarity. Based on the score corresponding to the combination of the structure and vehicle similarity, one or more vehicles may be presented to the user 104 as one or more alternatives to both the vehicle and structure as specified by the user 104 in the form 108.

In some embodiments, the client device 106 may be a personal computer, a laptop, a desktop, a tablet, a phone, a smartphone, a smartwatch, etc., that enables the user 104 to send a request message to the application server 112 and receive a response message for the request message. The communication network 102 may provide secure communication via IPsec and/or other tunneling protocols. The communication network 102 may be a wireline and/or wireless network, that may support communication over 3G, 4G, 5G, 6G, Wi-Fi, a Local Area Network (LAN), a metropolitan area network (MAN), a wide area network (WAN), Wi-Max, a public land mobile network (PLMN), and/or a public switching telephone network (PSTN), etc.

Figure 2:
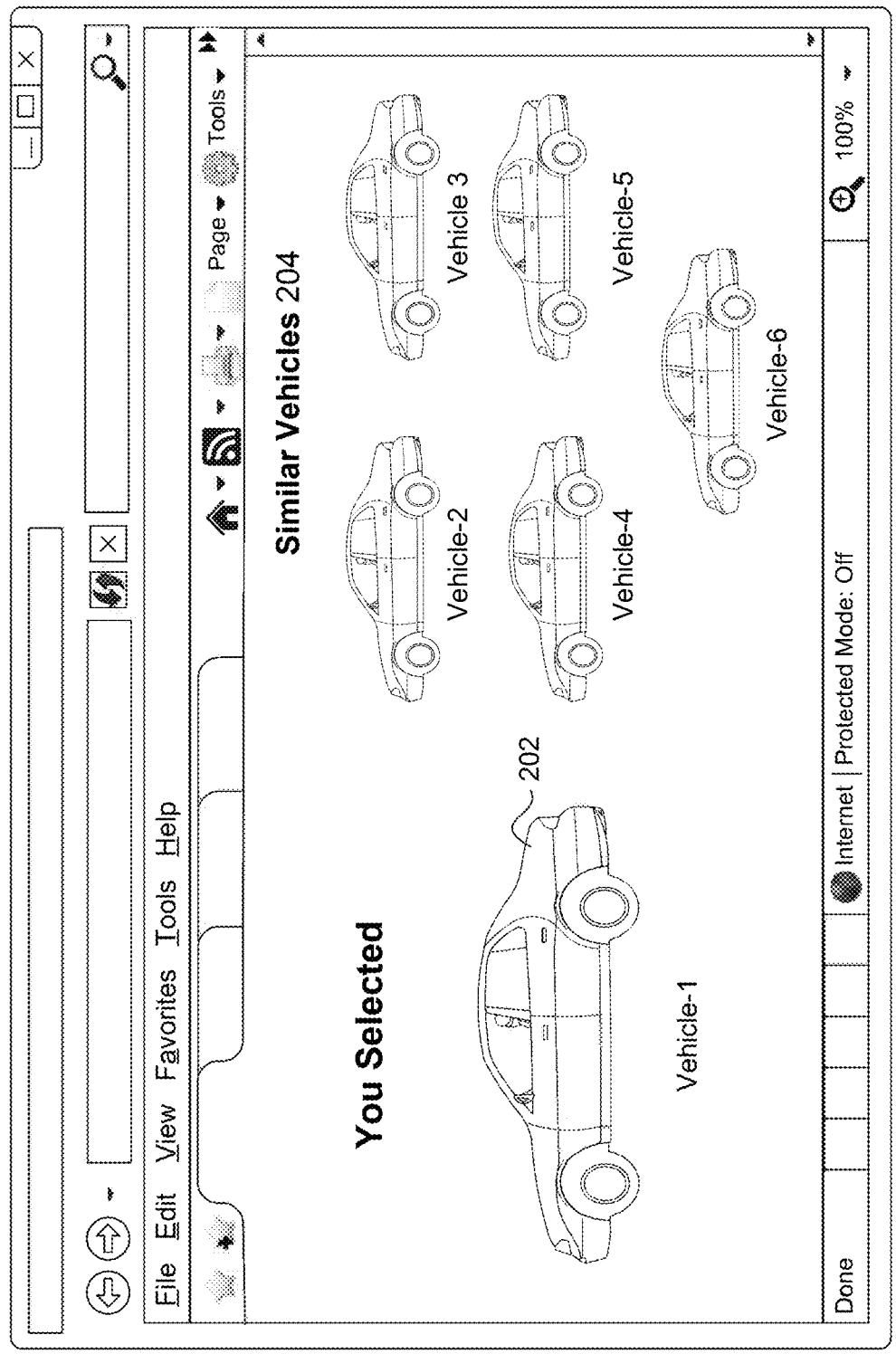
FIG. 2 is an example display output, according to some embodiments.

FIG. 2 is an example display output, according to some embodiments. As shown in FIG. 2, a vehicle-1 202 is the vehicle according to the configuration specified by the user 104 in the form 108. As described above, alternative vehicles vehicle-2 through vehicle-6 204 of the vehicle-1 202 are shown in FIG. 2. The alternative vehicles 204 are determined as described above. Further, each vehicle of the alternative vehicles 204 has one or more structures that may be similar to the structure of the buyer's choice. By way of non-limiting example, the buyer's choice of vehicle vehicle-1 202 may be a compact size vehicle of a particular make. As described above, the alternative vehicles vehicle-2 through vehicle-6 204 may be identified that all meet the specific criteria of being a compact size vehicle but from other manufacturers. Since the buyer may be more interested in purchasing a compact size vehicle from other manufacturers at the terms according to the structure of the buyer's choice, the buyer may be more likely to proceed to select a vehicle from the alternative vehicles 204.

Figure 3:
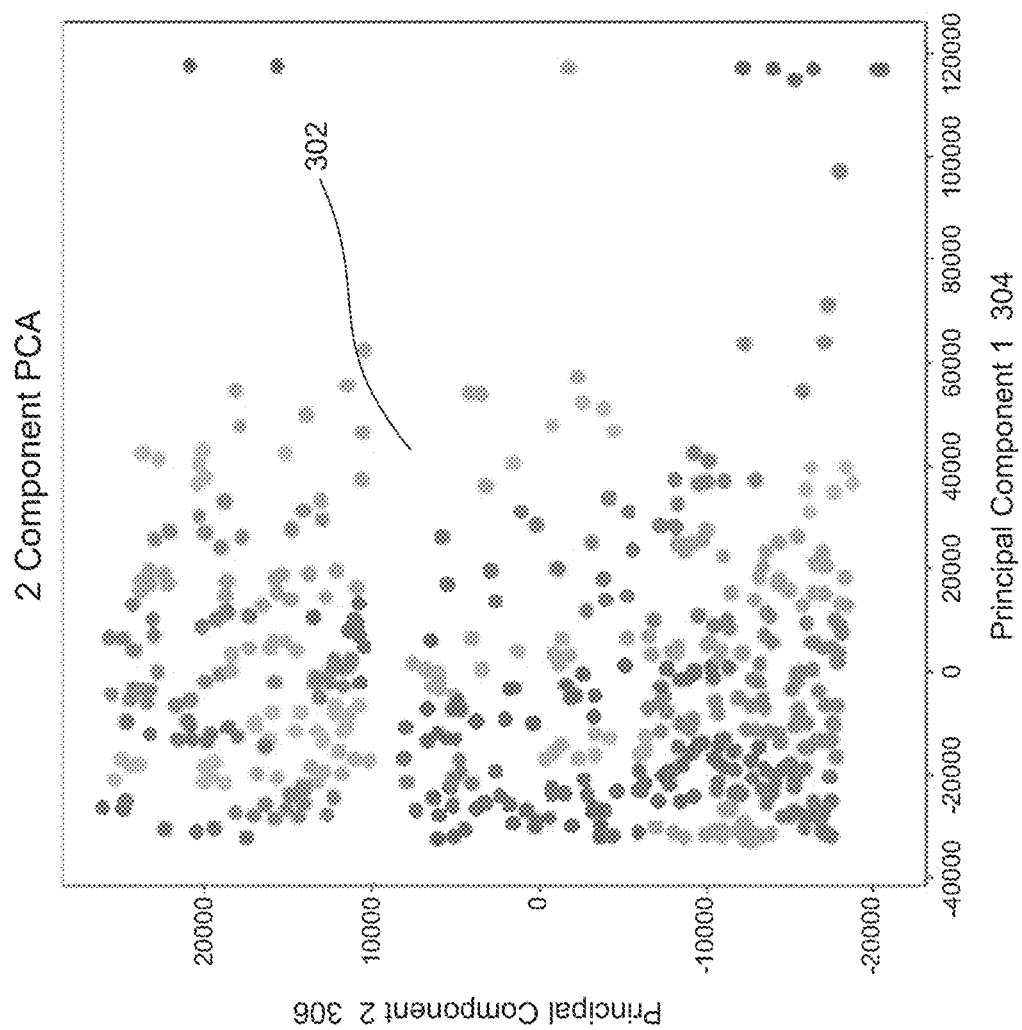
FIG. 3 illustrates a plurality of clusters plotted on a two-dimensional graph, according to some embodiments.

FIG. 3 illustrates a plurality of clusters plotted on a two-dimensional graph, according to some embodiments. The plurality of clusters are plotted in two dimensions for easy visualization using principal component analysis (PCA), However, the features used for comparison of vehicles can be n-dimensional. In some embodiments, an unsupervised learning technique for data classification, for example, K-means, may be used. In K-means, a plurality of data points are randomly selected as a plurality of cluster centers that are also known as centroids in the art, and then each data point is assigned to a cluster center of the plurality of cluster centers with the closest mean. A new mean is calculated for the cluster, and the process is repeated until it reaches convergence.

As described above, various facets of the vehicle may include body style, drive type, transmission type, engine, exterior color, interior color, make, model, mileage, trim, price, year, book value, etc. Each facet may be assigned a different weight, as shown in the table below as an example.

| Facet | Weight |
| --- | --- |
| Body Style | 4 |
| Drive Type | 1 |
| Transmission Type | 1 |
| Engine | 1 |
| Exterior Color | 1.25 |
| Interior Color | 1.1 |
| Make | 7 |
| Model | 4 |
| Mileage | 4 |

-continued

| Facet | Weight |
|---|---|
| Trim | 0.5 |
| Price | 5 |
| Year | 2 |
| Book Value | 1 |

Accordingly, a data point representing a vehicle may include a plurality of vectors in which each vector may correspond to a facet of the plurality of facets. Visualizing a cluster of such data points, including multi-dimensional vectors, can be simplified by performing principal components analysis to orthogonally transform possibly correlated variables into uncorrelated principal components. As shown in FIG. 3, a plurality of data points 302 are shown, in which on the X-axis principal component 1 304 may be represented, and on the Y-axis principal component 2 306 may be represented. The number of components for PCA may be pre-configured. For example, the number of components may be 2. Accordingly, the principal component 1 304 and the principal component 2 306 may be selected that account for the given amount of variance. By way of non-limiting example, the amount of variance for the principal component 1 304 maybe about 80 percentages, and the amount of variance for the principal component 2 306 maybe about 20 percentages.

Figure 4:
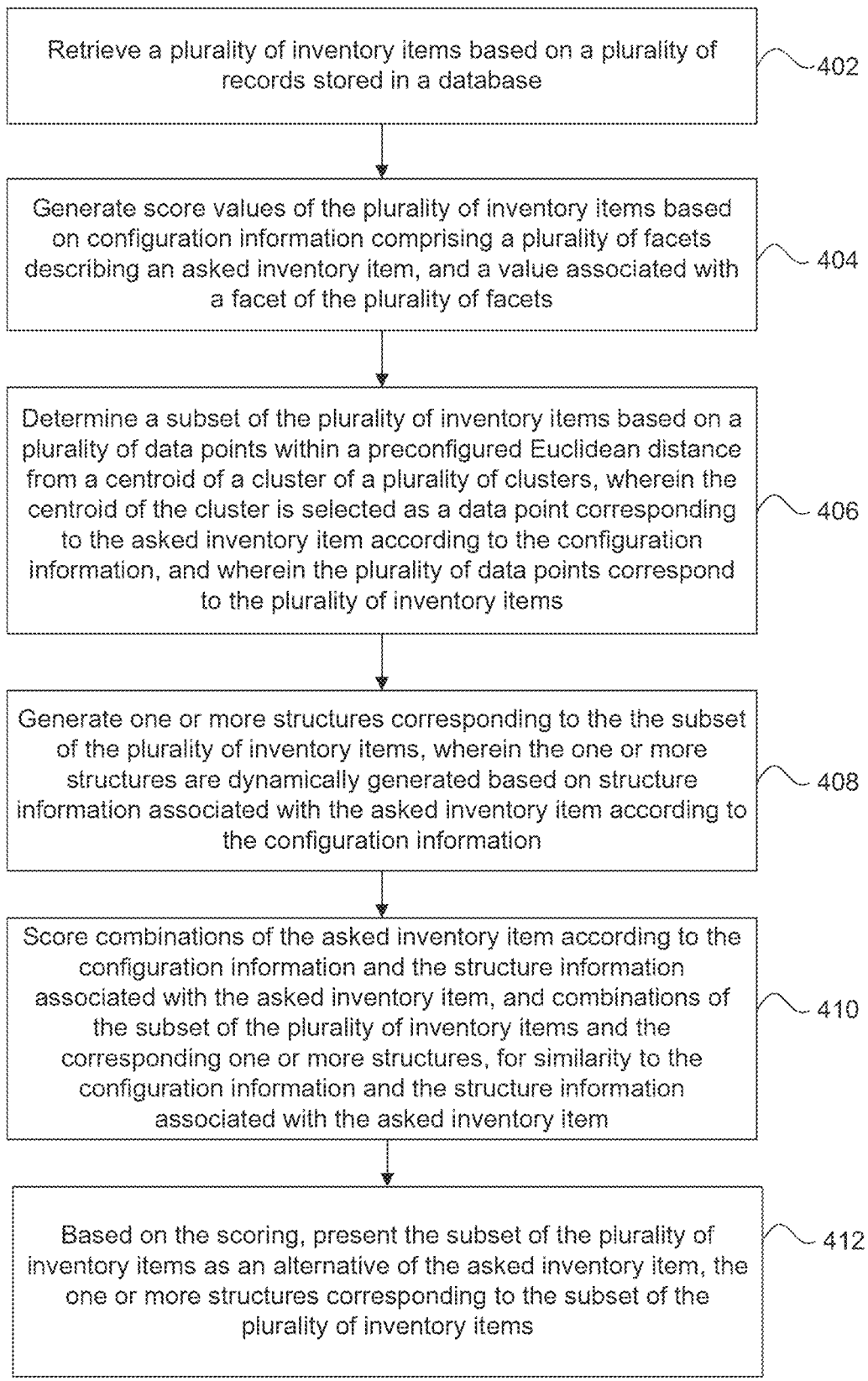
FIG. 4 is a flowchart illustrating a method for determining an alternative inventory item and a structure, according to some embodiments.

FIG. 4 is a flowchart illustrating a method for determining an alternative inventory item and a structure, according to some embodiments. As shown in FIG. 4, at step 402, the application server 112 may retrieve a plurality of inventory items based on a plurality of records stored in a database, as described above. By way of a non-limiting example, the inventory item may be, for example, a vehicle, an appliance such as a television, a refrigerator, etc., furniture such as a sofa, an office desk, etc. Further, the database may be at a separate database server, for example, as described above, the vehicle database server 110, or the database may be at the application server 112.

In accordance with some embodiments, at step 404, the application server 112 may generate score values of the plurality of inventory items based on configuration information. The configuration information includes a plurality of facets that describe an asked inventory item, for example, a vehicle. The configuration information also includes a value associated with a facet of the plurality of facets. The configuration information may include one or more default values for the facet of the plurality of facets. By way of non-limiting example, for the inventory item such as a vehicle, the plurality of facets may include but are not limited to make, model, year of manufacture, transmission type, engine, trim, mileage, a fuel type of the vehicle, a vehicle condition, etc. The application server 112 may generate score values, as described above with reference to FIG. 1, and, therefore, the mechanism of generating a score value is not repeated.

In accordance with some embodiments, at step 406, the application server 112 may determine a subset of the plurality of inventory items based on a plurality of data points within a preconfigured Euclidean distance from a centroid of a cluster of a plurality of customers. As described above, an artificial intelligence, including a neural network and/or machine learning algorithm, may be used to determine the subset of the plurality of inventory items. By way of a non-limiting example, PCA described above may be used for training the neural network and/or machine learning algorithm. Since only a few facets of the plurality of facets may be important, the few important facets may be determined or maybe preconfigured depending on the inventory item. The PCA is based on a plurality of dimensions that correspond with the number of few important facets.

As described above, a number of clusters may be arbitrarily selected based on a total number of the plurality of inventory items retrieved by the application server 112 at step 402. By way of a non-limiting example, the number of clusters may be preconfigured or determined according to various methods known to a person skilled in the art, such as elbow, silhouette, and/or gap statistic methods, etc. Since one centroid is the data point that corresponds to asked inventory, centroids for the other clusters may be arbitrarily selected. Thus, the plurality of data points that correspond to the plurality of inventory items retrieved at step 402 may be analyzed using the PCA for the reduced number of dimensions. To perform the PCA, the application server 112 may determine a first principal component that corresponds with data points of variance up to a first variance value, and a second principal component that corresponds with data points of variance up to a second variance value. The first variance value may be different from the second variance value. By way of non-limiting example, the first variance value may be about 80 percentages, and the second variance value may be about 20 percentages.

In accordance with some embodiments, at step 408, the application server 112 may generate one or more structures corresponding to the the subset of the plurality of inventory items, as described herein. The one or more generated structures may include one or more aspects that have a value within a preconfigured threshold limit. For example, the one or more aspects may include a loan term, a rate of interest, a down-payment value, a maximum loan amount, and/or a monthly installment, etc. By way of non-limiting example, for the rate of interest aspect, the preconfigured threshold limit may be within +/−0.2 percentage range. By way of a non-limiting example, when the generated loan structure for the asked inventory item is out of policy, the application server 112 may generate the one or more structures corresponding to the subset of the plurality of inventory items.

In accordance with some embodiments, the one or more structures may be dynamically generated based on structure information associated with the asked inventory item according to the configuration information. By way of non-limiting example, the structure information may generated based on the one or more input factors that may include at least one of a credit record, a storage time period, and an inventory condition, etc. The procedure of generating the one or more structures is described in detail with reference to FIG. 1 above, and, therefore, is not being repeated.

In accordance with some embodiments, at step 410, the application server 112 may score combinations of the asked inventory item according to the configuration information and the structure information associated with the asked inventory item, and combinations of the subset of the plurality of inventory items and the corresponding one or more loan structures, for similarity to the configuration information and the loan structure information associated with the asked inventory item. And, at step 412, the application server 112 may present, based on the score corresponding to the combination of the configuration information and the structure, the subset of the plurality of inventory items as an alternative of the asked inventory item.

Figure 5:
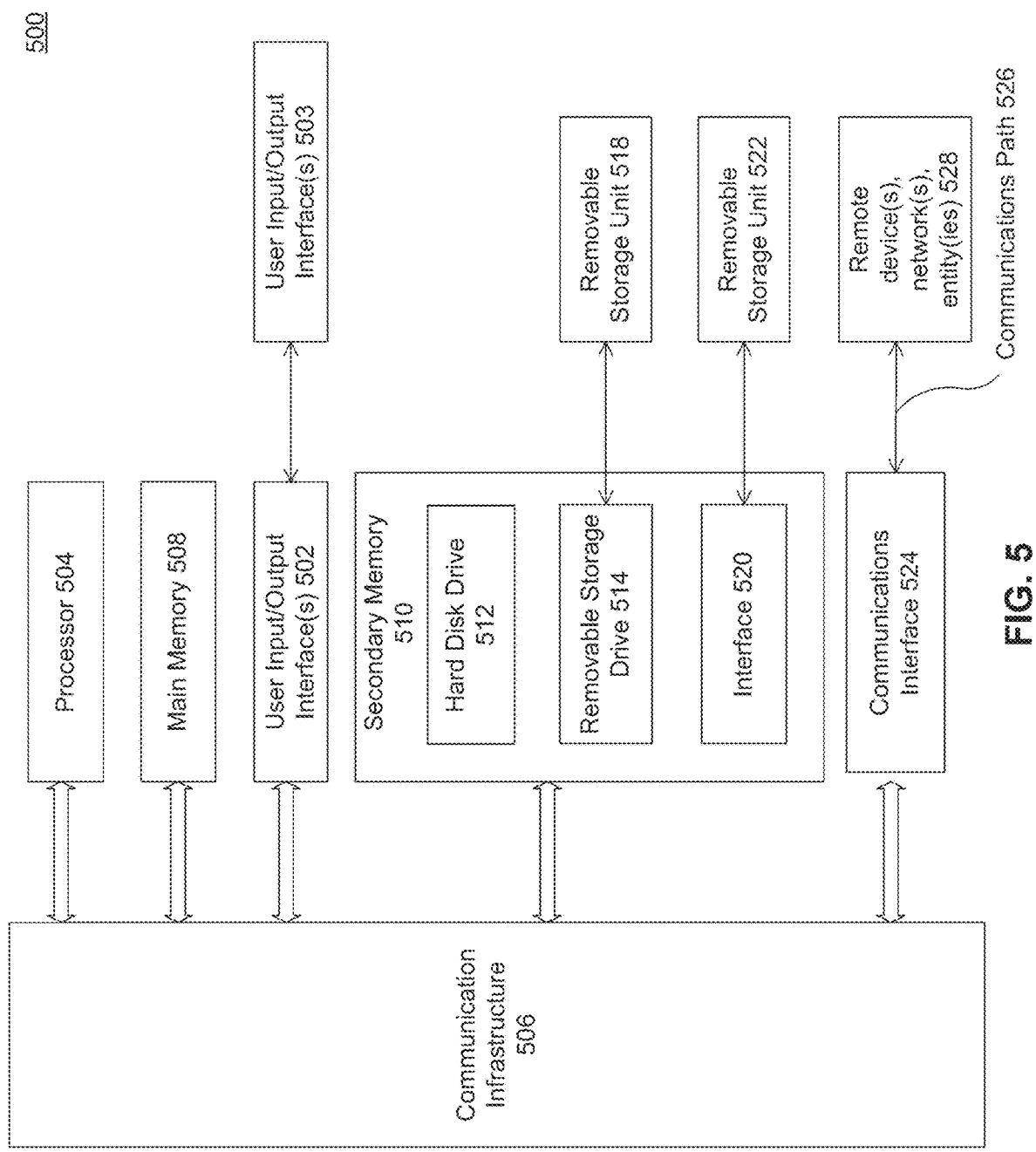
FIG. 5 illustrates an example computer system, according to some embodiments.

FIG. 5 illustrates an example computer system in accordance with some embodiments.

Various embodiments may be implemented, for example, using one or more well-known computer systems, such as a computer system 500, as shown in FIG. 5. One or more computer systems 500 may be used, for example, to implement any of the embodiments discussed herein, as well as combinations and sub-combinations thereof. The computer systems 500 may be used for the implementation of one or more embodiments described above.

The computer system 500 may include one or more processors (also called central processing units, or CPUs), such as a processor 504. The processor 504 may be connected to a communication infrastructure or bus 406.

The computer system 500 may also include user input/output device(s) 503, such as monitors, keyboards, pointing devices, etc., which may communicate with communication infrastructure 506 through user input/output interface(s) 502.

One or more processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 500 may also include a main or primary memory 508, such as random access memory (RAM). Main memory 508 may include one or more levels of cache. Main memory 508 may have stored therein control logic (i.e., computer software) and/or data.

The computer system 500 may also include one or more secondary storage devices or memory 510. The secondary memory 510 may include, for example, a hard disk drive 512 and/or a removable storage device or drive 514. The removable storage drive 514 may be a floppy disk drive, a magnetic tape drive, a compact disk drive, an optical storage device, tape backup device, and/or any other storage device or storage drive.

The removable storage drive 514 may interact with a removable storage unit 518. The removable storage unit 518 may include a computer-usable or readable storage device having stored thereon computer software (control logic) and/or data. The removable storage unit 518 may be a floppy disk, magnetic tape, compact disk, DVD, optical storage disk, and/any other computer data storage device. The removable storage drive 514 may read from and/or write to the removable storage unit 518.

The secondary memory 510 may include other means, devices, components, instrumentalities, or other approaches for allowing computer programs and/or other instructions and/or data to be accessed by the computer system 500. Such means, devices, components, instrumentalities, or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 500 may further include a communication or network interface 524. The communication interface 524 may enable the computer system 500 to communicate and interact with any combination of external devices, external networks, external entities, etc. (individually and collectively referenced by reference number 528). For example, the communication interface 524 may allow the computer system 500 to communicate with the external or remote devices 528 over communications path 526, which may be wired and/or wireless (or a combination thereof), and which may include any combination of LANs, WANs, the Internet, etc. Control logic and/or data may be transmitted to and from the computer system 500 via the communication path 526.

The computer system 500 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

The computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In accordance with some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, the computer system 500, the main memory 508, the secondary memory 510, and the removable storage units 518 and 522, as well as tangible articles of manufacture embodying any combination of the foregoing. Such control logic, when executed by one or more data processing devices (such as the computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments but should be defined only in accordance with the following claims and their equivalents.

What is claimed is:

1. A method, comprising:
    receiving, by one or more computing devices, from a client device, a query comprising configuration information describing an asked inventory item and information describing a preferred structure, wherein the configuration information comprises a plurality of facet values corresponding to respective facets of a plurality of facets of the asked inventory item;
    retrieving, by the one or more computing devices, a plurality of inventory items based on the configuration information describing the asked inventory item from a plurality of records stored in a first database;
    generating, by the one or more computing devices, score values of the plurality of inventory items based on the plurality of facet values of the configuration information;
    defining, by the one or more computing devices, a plurality of data points each corresponding to the score values for a respective inventory item of the plurality of inventory items, wherein:
        the plurality of data points are placed into a plurality of clusters within n-dimensional space by a clustering algorithm based on the score values;
        each dimension of the n dimensions corresponds to a facet of the asked inventory item; and
        a data point of the plurality of data points corresponding to the asked inventory item is a centroid of a cluster of the plurality of clusters;
    determining, by the one or more computing devices, a subset of the plurality of inventory items that are most similar to the asked inventory item based on a plurality of data points within a preconfigured distance from the centroid of the cluster;
    retrieving, by the one or more computing devices, from a second database, financial information for a buyer and underwriting policies for a lender from which the buyer has obtained prequalification;
    generating, by the one or more computing devices, one or more structures corresponding to the subset of the plurality of inventory items, wherein the one or more structures are dynamically generated based on the underwriting policies for the lender, the financial information for the buyer, the preferred structure information and structure information associated with the asked inventory item;
    scoring, by the one or more computing devices, a combination of the asked inventory item according to the configuration information and the preferred structure, and combinations of the subset of the plurality of inventory items and the corresponding one or more structures, for similarity to the configuration information and the preferred structure; and
    based on the scoring, responding, by the one or more computing devices, to the query with one or more combinations of an alternative inventory item and corresponding structure from the subset of the plurality of inventory items and the one or more structures corresponding to the subset of the plurality of inventory items.

2. The method of claim 1, wherein the plurality of facets comprise at least one of a body style of a vehicle, an exterior color of the vehicle, a make of the vehicle, a model of the vehicle, a trim of the vehicle, a transmission type of the vehicle, a fuel type of the vehicle, a vehicle condition, or a manufacturing year of the vehicle.

3. The method of claim 1, wherein the generating the score values comprises:
    generating, by the one or more computing devices, the score values of the plurality of inventory items based on a plurality of weights assigned to the plurality of facets.

4. The method of claim 1, wherein the determining the subset of the plurality of inventory items comprises:
    performing, by the one or more computing devices, principal component analysis of the plurality of data points based on a preconfigured number of dimensions.

5. The method of claim 4, wherein the performing the principal component analysis comprises:
    determining, by the one or more computing devices, a first principal component that corresponds with data points of variance up to a first variance value; and
    determining, by the one or more computing devices, a second principal component that corresponds with data points of variance up to a second variance value, wherein the first variance value is different from the second variance value.

6. The method of claim 1, wherein the generating the one or more structures comprises:
    generating, by the one or more computing devices, the one or more structures that comprise one or more aspects having a value within a preconfigured threshold limit specified for one or more aspects of the structure information associated with the asked inventory item, wherein the financial information for the buyer comprises at least one of an address, an income, or a credit record; and
    wherein the structure information associated with the asked inventory item is based on at least one of a storage time period or an inventory condition.

7. The method of claim 6, wherein the one or more aspects comprise at least one of a monthly installment, a loan term, an interest rate, a down-payment value, or a maximum loan value.

8. An apparatus, comprising:
    a memory for storing operations; and
    one or more processors, communicatively coupled to the memory, configured to perform the operations comprising:

receiving from a client device, a query comprising configuration information describing an asked inventory item and information describing a preferred structure, wherein the configuration information comprises a plurality of facet values corresponding to respective facets of a plurality of facets of the asked inventory item;

retrieving a plurality of inventory items based on the configuration information describing the asked inventory item from a plurality of records stored in a first database;

generating score values of the plurality of inventory items based on the plurality of facet values of the configuration information;

defining a plurality of data points each corresponding to the score values for a respective inventory item of the plurality of inventory items, wherein:
the plurality of data points are placed into a plurality of clusters within n-dimensional space by a clustering algorithm based on the score values;
each dimension of the n dimensions corresponds to a facet of the asked inventory item; and
a data point of the plurality of data points corresponding to the asked inventory item is a centroid of the plurality of clusters;

determining a subset of the plurality of inventory items that are most similar to the asked inventory item based on a plurality of data points within a preconfigured distance from the centroid of the cluster;

retrieving, from a second database, financial information for a buyer and underwriting policies for a lender from which the buyer has obtained prequalification;

generating one or more structures corresponding to the subset of the plurality of inventory items, wherein the one or more structures are dynamically generated based on the underwriting policies for the lender, the financial information for the buyer, the preferred structure information, and structure information associated with the asked inventory item;

scoring a combination of the asked inventory item according to the configuration information and the preferred structure, and combinations of the subset of the plurality of inventory items and the corresponding one or more structures, for similarity to the configuration information and the preferred structure; and based on the scoring, responding to the query with one or more combinations of an alternative inventory item and corresponding structure from the subset of the plurality of inventory items and the one or more structures corresponding to the subset of the plurality of inventory items.

9. The apparatus of claim 8, wherein the plurality of facets comprise at least one of a body style of a vehicle, an exterior color of the vehicle, a make of the vehicle, a model of the vehicle, a trim of the vehicle, a transmission type of the vehicle, a fuel type of the vehicle, a vehicle condition, or a manufacturing year of the vehicle.

10. The apparatus of claim 8, wherein the generating the score values, the operations further comprise:
generating the score values of the plurality of inventory items based on a plurality of weights assigned to the plurality of facets.

11. The apparatus of claim 8, wherein the determining the subset of the plurality of inventory items, the operations further comprise:

performing principal component analysis of the plurality of data points based on a preconfigured number of dimensions.

12. The apparatus of claim 11, wherein the performing the principal component analysis, the operations further comprise:
determining a first principal component that corresponds with data points of variance up to a first variance value; and
determining a second principal component that corresponds with data points of variance up to a second variance value,
wherein the first variance value is different from the second variance value.

13. The apparatus of claim 8, wherein the generating the one or more structures, the operations further comprise:
generating the one or more structures that comprise one or more aspects having a value within a preconfigured threshold limit specified for one or more aspects of the structure information associated with the asked inventory item,
wherein the financial information for the buyer comprises at least one of an address, an income, or a credit record; and
wherein the structure information associated with the asked inventory item is based on at least one of a storage time period or an inventory condition.

14. The apparatus of claim 13, wherein the one or more aspects comprise at least one of a monthly installment, a loan term, an interest rate, a down-payment value, or a maximum loan value.

15. A non-transitory, tangible computer-readable device having instructions stored thereon that, when executed by at least one computing device, cause the at least one computing device to perform operations comprising:
receiving from a client device, a query comprising configuration information describing an asked inventory item and information describing a preferred structure, wherein the configuration information comprises a plurality of facet values corresponding to respective facets of a plurality of facets of the asked inventory item;
retrieving a plurality of inventory items based on the configuration information describing the asked inventory item from a plurality of records stored in a first database;
generating score values of the plurality of inventory items based on the plurality of facet values of the configuration information;
defining a plurality of data points each corresponding to the score values for a respective inventory item of the plurality of inventory items, wherein:
the plurality of data points are placed into a plurality of clusters within n-dimensional space by a clustering algorithm based on the score values;
each dimension of the n dimensions corresponds to a facet of the asked inventory item; and
a data point of the plurality of data points corresponding to the asked inventory item is a centroid of a cluster of the plurality of clusters;
determining a subset of the plurality of inventory items that are most similar to the asked inventory item based on a plurality of data points within a preconfigured distance from the centroid of the cluster;
retrieving, from a second database, financial information for a buyer and underwriting policies for a lender from which the buyer has obtained prequalification;

generating one or more structures corresponding to the subset of the plurality of inventory items, wherein the one or more structures are dynamically generated based on the underwriting policies for the lender, the financial information for the buyer, the preferred structure information and structure information associated with the asked inventory item;

scoring a combination of the asked inventory item according to the configuration information and the preferred structure, and combinations of the subset of the plurality of inventory items and the corresponding one or more structures, for similarity to the configuration information and the preferred structure; and based on the scoring, responding to the query with one or more combinations of an alternative inventory item and corresponding structure from the subset of the plurality of inventory items and the one or more structures corresponding to the subset of the plurality of inventory items.

16. The non-transitory, tangible computer-readable device of claim 15, wherein the generating the score values, the operations further comprise:

generating the score values of the plurality of inventory items based on a plurality of weights assigned to the plurality of facets.

17. The non-transitory, tangible computer-readable device of claim 16, wherein the determining the subset of the plurality of inventory items, the operations further comprise:

performing principal component analysis of the plurality of data points based on a preconfigured number of dimensions.

18. The non-transitory, tangible computer-readable device of claim 17, wherein the performing the principal component analysis, the operations further comprise:

determining a first principal component that corresponds with data points of variance up to a first variance value; and determining a second principal component that corresponds with data points of variance up to a second variance value, wherein the first variance value is different from the second variance value.

19. The non-transitory, tangible computer-readable device of claim 15, wherein the generating the one or more structures, the operations further comprise:

generating the one or more structures that comprise one or more aspects having a value within a preconfigured threshold limit specified for one or more aspects of the structure information associated with the asked inventory item, wherein the financial information for the buyer comprises at least one of an address, an income, or a credit record; and wherein the structure information associated with the asked inventory item is based on at least one of a storage time period or an inventory condition.

20. The non-transitory, tangible computer-readable device of claim 19, wherein the one or more aspects comprise at least one of a monthly installment, a loan term, an interest rate, a down-payment value, or a maximum loan value, and wherein the plurality of facets comprise at least one of a body style of a vehicle, an exterior color of the vehicle, a make of the vehicle, a model of the vehicle, a trim of the vehicle, a transmission type of the vehicle, a fuel type of the vehicle, a vehicle condition, and/or a manufacturing year of the vehicle.

* * * * *